M. VON ROHR.
GALILEAN TELESCOPE LENS SYSTEM.
APPLICATION FILED JAN. 25, 1910.

962,920. Patented June 28, 1910.

Witnesses:
Paul Krüger
Richard Hahn

Inventor:
Moritz von Rohr

UNITED STATES PATENT OFFICE.

MORITZ VON ROHR, OF JENA, GERMANY, ASSIGNOR TO THE FIRM OF CARL ZEISS, OF JENA, GERMANY.

GALILEAN-TELESCOPE LENS SYSTEM.

962,920.  Specification of Letters Patent.  Patented June 28, 1910.

Application filed January 25, 1910. Serial No. 540,034.

*To all whom it may concern:*

Be it known that I, MORITZ VON ROHR, a citizen of the German Empire, residing at Carl-Zeiss strasse, Jena, in the Grand Duchy of Saxe-Weimar, Germany, have invented a new and useful Galilean-Telescope Lens System, of which the following is a specification.

By the present invention the lens system of the Galilean telescope is improved, and particularly that form of the system in which an objective consisting of two collective members (*i. e.* separate system parts) coacts with any negative ocular. The lens systems of this kind hitherto known have objective members which differ from ordinary telescope objectives achromatized by being cemented of two parts at the most in that occasionally a meniscus having a weak median curvature is substituted for the convexo-plane lens form.

The object of the present invention is to add, in the lens system as described, without increasing the number of lenses, to the chromatic correction as hitherto attained the correction of the errors of oblique pencils, particularly distortion and astigmatism. This is attained, when the power of the front surface of the hinder objective member, while its positive sign is maintained, is so increased that it amounts at least to four fifths of the power of the entire objective.

From the investigations for improving the lens system corrected according to this invention, there has further resulted that for the chromatic correction of the objective or even of the entire lens system a single cemented surface now suffices, provided that it is allotted to the hinder objective member. The front objective member is then formed by a single lens.

In another direction, from intrinsic researches the knowledge has been gained that the zones of the errors of oblique pencils become the smallest, if in correcting these errors the assistance of the cemented surface be dispensed with by taking full advantage of the fundamental invention. In this case the cemented surface is utilized for chromatic correction only, for which purpose the kinds of glass joined in it, while being sufficiently different as to dispersion, must have, as is well known, no or only a small difference in the median refractive index.

Figure 1:
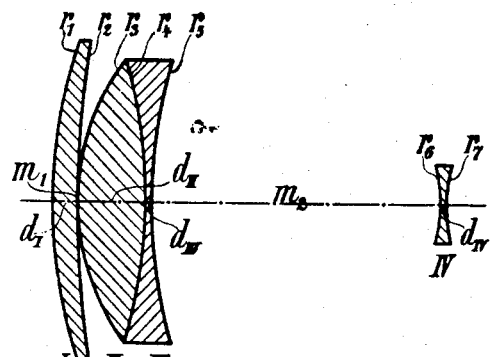
Figure 2:
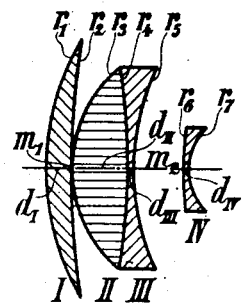

In the drawing, Figure 1 is a diagram of a Galilean telescope lens system improved according to the invention, and Fig. 2 is a diagram of another lens system of this kind.

In both examples the hinder member only of the objective is furnished with a cemented surface. In the example of Fig. 2 this single cemented surface has merely a chromatic effect.

*Fig. 1.*

KINDS OF GLASS.

$n_{DI} = n_{DII} = n_{DIV} = 1.5726$  $\nu_I = \nu_{II} = \nu_{IV} = 57.5$
$n_{DIII} = 1.6245$  $\nu_{III} = 35.8$

RADII, THICKNESSES AND DISTANCES.

$r_1 = +90.0$  $d_I = 5.0$
$r_2 = +185.0$  $m_1 = 0.0$
$r_3 = +43.0$  $d_{II} = 13.2$
$r_4 = -92.0$  $d_{III} = 1.0$
$r_5 = +91.0$  $m_2 = 57.0$
$r_6 = -28.1$  $d_{IV} = 1.0$
$r_7 = +28.1$

The power of the surface having the radius $r_3$ amounts to $+13.3$, the power of the objective to $+10.2$ dioptries.

*Fig. 2.*

KINDS OF GLASS.

$n_{DI} = 1.5163$  $\nu_I = 64.0$
$n_{DII} = 1.6099$  $\nu_{II} = 58.9$
$n_{DIII} = 1.6103$  $\nu_{III} = 37.2$
$n_{DIV} = 1.5825$  $\nu_{IV} = 46.4$

RADII, THICKNESSES AND DISTANCES.

$r_1 = +48.0$  $d_I = 5.0$
$r_2 = +156.5$  $m_1 = 0.0$
$r_3 = +25.0$  $d_{II} = 11.0$
$r_4 = -120.0$  $d_{III} = 1.0$
$r_5 = +44.7$  $m_2 = 9.8$
$r_6 = +66.5$  $d_{IV} = 1.0$
$r_7 = +11.5$

The power of the surface having the radius $r_3$ amounts to $+24.4$, the power of the objective to $+21.1$ dioptries.

I claim:

1. In the lens system of the Galilean telescope, the combination with the ocular of an objective which consists of two collective members, the power of the front surface of the hinder member amounting at least to four fifths of the power of the entire objective.

2. In the lens system of the Galilean telescope, the combination with the ocular of an objective which consists of two collective members, the front member being a single lens and the front surface of the hinder member having at least four fifths of the power of the entire objective.

3. In the lens system of the Galilean telescope, the combination with the ocular of an objective which consists of two collective members, the front member being a single lens, the hinder member being cemented of two lenses which have substantially the same refractive index, and the front surface of the hinder member having at least four fifths of the power of the entire objective.

MORITZ VON ROHR.

Witnessess:
 PAUL KRÜGER,
 ALFRED MACKEDANZ.